United States Patent [19]

Boyer et al.

[11] Patent Number: 4,864,331

[45] Date of Patent: Sep. 5, 1989

[54] OFFSET ELECTROSTATIC IMAGING PROCESS

[75] Inventors: Alan H. Boyer, East Sullivan; Graham D. Walter, Peterborough; Robert A. Moore, Amherst, all of N.H.

[73] Assignee: Markem Corporation, Keene, N.H.

[21] Appl. No.: 921,393

[22] Filed: Oct. 22, 1986

[51] Int. Cl.[4] ........ G01D 25/00

[52] U.S. Cl. ........ 346/159; 346/160.1

[58] Field of Search ........ 346/159, 160.1; 358/300; 355/30 D; 430/103, 107-111

[56] References Cited

U.S. PATENT DOCUMENTS

| | | | |
|---|---|---|---|
| 3,198,648 | 8/1965 | Trimbur, II | 346/159 |
| 3,443,517 | 5/1969 | Gundlach | 346/159 |
| 3,501,294 | 3/1970 | Joseph | 346/159 |
| 3,577,345 | 5/1971 | Jacknow et al. | 346/159 |
| 3,590,000 | 6/1971 | Palermiti et al. | 346/159 |
| 3,592,642 | 7/1971 | Kaupp | 346/159 |
| 3,609,082 | 9/1971 | Moriconi et al. | 346/159 |
| 3,615,405 | 10/1971 | Shebanow | 346/159 |
| 3,623,123 | 11/1971 | Jvirblis | 346/159 |
| 3,624,661 | 11/1971 | Shebanow | 346/159 |
| 3,673,598 | 6/1972 | Simm et al. | 346/159 |
| 3,689,935 | 9/1972 | Pressman et al. | 346/159 |
| 3,692,402 | 9/1972 | Solarek | 346/159 |
| 3,701,996 | 10/1972 | Perley | 346/159 |
| 3,740,334 | 6/1973 | Jacknow et al. | 346/159 |
| 3,779,166 | 12/1973 | Pressman et al. | 346/159 |
| 3,798,609 | 3/1974 | Frohback | 346/159 |
| 3,854,975 | 12/1974 | Brenneman et al. | 346/159 |
| 3,874,894 | 4/1975 | Pederman | 346/159 |
| 3,879,785 | 4/1975 | Roth et al. | 346/159 |
| 3,907,560 | 9/1975 | Sable | 346/159 |
| 3,937,571 | 2/1976 | Krulik et al. | 346/159 |
| 3,940,270 | 2/1976 | Krulik et al. | 346/159 |
| 3,980,575 | 9/1976 | DeRoo et al. | 346/159 |
| 4,016,813 | 4/1977 | Pressman et al. | 346/159 |
| 4,033,890 | 7/1977 | Tamai et al. | 346/159 |
| 4,110,035 | 8/1978 | Kamata | 346/159 |
| 4,195,927 | 4/1980 | Fotland et al. | 346/159 |
| 4,253,761 | 3/1981 | Takizawa et al. | 346/159 |
| 4,267,556 | 5/1981 | Fotland et al. | 346/159 |
| 4,271,249 | 6/1981 | Gilliams et al. | 346/159 |
| 4,331,755 | 5/1982 | Gilliams et al. | 346/159 |
| 4,331,756 | 5/1982 | Mayer et al. | 346/159 |
| 4,338,614 | 7/1982 | Pressman et al. | 346/159 |
| 4,365,549 | 12/1982 | Fotland et al. | 346/159 |
| 4,367,275 | 1/1983 | Aoki et al. | 346/159 |
| 4,409,604 | 10/1983 | Fotland | 346/159 |
| 4,457,615 | 7/1984 | Seanor | 346/159 |
| 4,468,445 | 8/1984 | Kelly et al. | 346/159 |
| 4,518,468 | 5/1985 | Fotland et al. | 346/159 |
| 4,619,515 | 10/1986 | Maczuszenko et al. | 346/159 |
| 4,734,721 | 3/1988 | Boyer et al. | 346/159 |
| 4,772,901 | 9/1988 | Boyer et al. | 346/159 |
| 4,809,026 | 2/1989 | Boyer et al. | 346/155 |
| 4,809,027 | 2/1989 | Boyer et al. | 346/159 |

FOREIGN PATENT DOCUMENTS

| | | | |
|---|---|---|---|
| 52-82239 | 7/1977 | Japan | 346/159 |
| 57-176083 | 10/1982 | Japan | 346/159 |
| 60-262172 | 12/1985 | Japan | 346/159 |
| 1259514 | 6/1969 | United Kingdom | 346/159 |

OTHER PUBLICATIONS

R. C. Tucker, Jr., "Plasma and Detonation Gun Deposition Techniques and Coating Properties," *Deposition Technologies for Films and Coatings*, ch. 11, pp. 454-464 (1982).

*Primary Examiner*—Arthur G. Evans

*Attorney, Agent, or Firm*—Robbins & Laramie

[57] ABSTRACT

An offset electrostatic imaging process is disclosed which comprises the steps of (a) forming a latent electrostatic image on a dielectric imaging member, said dielectric imaging member being prepared by coating an electrically conductive substrate with a porous layer of a non-photoconductive metal oxide using a deposition process; (b) developing the latent electrostatic image with a developer material which comprises a silicone polymer and from about 0.5 to about 5 percent by weight of a metal salt of a fatty acid; (c) transferring the developed image to an image receiving surface by applying pressure between the dielectric imaging member and the image receiving surface; (d) cleaning the dielectric imaging member using a first cleaning means which is effective to remove developer material residue from above the surface of the porous oxide layer; and (e) further cleaning the dielectric imaging member using a second cleaning means which is effective to remove developer material residue from the pores below the surface of the oxide layer.

17 Claims, 3 Drawing Sheets

OFFSET ELECTROSTATIC IMAGING PROCESS

BACKGROUND OF THE INVENTION

1. Field of the Invention

The present invention relates generally to an offset electrostatic imaging process, and more particularly, to such a process in which a dielectric imaging member prepared with a plasma spraying or detonation gun deposition technique can be advantageously employed.

2. Description of the Prior Art

In a typical electrostatic imaging process, a latent electrostatic image is formed on a dielectric charge retentive surface using a non-optical means, such as an electrostatic print head which generates ions by the corona discharge from a small diameter wire or point source. The dielectric surface can be either on the final image recording or receiving medium or on an intermediate transfer element, such as a cylindrical drum.

The latent electrostatic image is developed by depositing a developer material containing oppositely charged toner particles. The toner particles are attracted to the oppositely charged latent electrostatic image on the dielectric surface. If the dielectric surface is on the final recording medium, the developed image can then be fixed by applying heat and/or pressure. If the dielectric surface is on an intermediate transfer element, however, the developed image must first be transferred to the final recording medium, for example plain paper, and then fixed by the application of heat and/or pressure. Alternatively, the developed image may be fixed to the final recording medium by means of the high pressure applied between the dielectric-coated transfer element and a pressure roller, between which the final recording medium passes. Because not all of the developer material transfers to the final recording medium during the pressure transfer step, a residue of developer material will remain on the dielectric surface.

The intermediate transfer element in an offset electrostatic imaging process is typically a cylindrical drum made from a non-magnetic, electrically conductive material, such as aluminum or stainless steel, which is coated with a dielectric material. Suitable dielectric materials include polymers, such as polyesters, polyamides, and other insulating polymers, glass enamel, and aluminum oxide, particularly anodized aluminum oxide. Dielectric materials such as aluminum oxide are preferred to layers of polymers because they are much harder, and therefore, are not as readily abraded by the developer materials and the high pressure being applied. Anodized aluminum oxide layers have been particularly preferred as dielectric layers because they have smoother, less porous surfaces which are less likely to become clogged with developer material residue after repeated use.

Methods of depositing aluminum oxide layers on the conductive drum surfaces other than anodizing an aluminum drum, such as flame or plasma sprayed aluminum oxide, have been suggested. However, these other methods have never been adopted in practice because the aluminum oxide layers produced by flame or plasma spraying techniques are very porous and rough surfaces become very readily clogged with developer material residue. When the porous dielectric layer becomes clogged with developer material residue, the dielectric drum fails because the surface becomes laterally conductive, and thus, incapable of retaining an electrostatic latent charge image.

In order to maintain the dielectric properties of the porous dielectric layer, it has been found desirable to seal the pores with a polymer, such as epoxy, or a metal salt of a fatty acid, such as zinc stearate. The sealant prevents moisture from being absorbed by the porous layer which would cause the layer to become more conductive and less able to retain an electrostatic charge. The sealant improves the dielectric properties and also improves the release properties which permit the developed electrostatic image to be more completely transferred under pressure. Any moisture present in the porous dielectric layer should be removed prior to sealing using heat, vacuum, dessication, or a combination thereof.

Developer material residue can be cleaned from a sealed anodized aluminum oxide dielectric layer after each use by using a doctor blade to scraped the surface. Although anodized aluminum oxide dielectric layers have been found to be harder and have longer lifetimes than many other types of dielectric layers, they still are worn down or abraded by repeated use and become less capable of retaining an electrostatic charge.

SUMMARY OF THE INVENTION

In accordance with the offset electrostatic imaging process of the present invention, it is possible to employ a dielectric imaging member having a harder dielectric layer and longer lifetime than had been heretofore achieved in practice.

The dielectric imaging member of the present invention is prepared by coating a conductive substrate with a porous layer of a non-photoconductive metal oxide using a deposition process, such as a plasma spraying or detonation gun deposition process. Preferably, the metal oxide layer should exhibit a diamond pyramid hardness (kg/mm$^2$ @ 300 g load) of at least 500 and preferably 1000 or more, and a surface capacitance of about 600–1000 picofarads/in$^2$. Moisture is removed from the porous metal oxide layer and then the pores are sealed by coating the porous layer with a metal salt of a fatty acid.

The offset electrostatic imaging process of the present invention comprises the steps of forming a latent electrostatic image on the dielectric imaging member prepared as described above, developing the latent electrostatic image with a developer material, transferring the developed electrostatic image to an image receiving surface by means of pressure applied between the dielectric imaging member and the image receiving surface, and cleaning the dielectric imaging member using a first cleaning means, such as a doctor blade, which is effective to remove developer material residue from above the surface of the porous oxide layer, and further cleaning the dielectric imaging member using a second cleaning means, such as a fibrous material, which is effective to remove developer material residue from the pores below the surface of the oxide layer.

The latent electrostatic image can be formed using an ion modulated electrostatic print head. A preferred type of print head includes a modulated aperture board having a plurality of selectively controlled apertures therein, and an ion generator for providing ions for electrostatic projection through the apertures and onto a dielectric imaging member.

A developer material which is suitable for developing the latent electrostatic image in accordance with the present process comprises particles of a toner which include a silicone polymer, and from about 0.5 to about 5 percent by weight of particles of a metal salt of a fatty acid. Preferably, the developer material contains the same metal salt of a fatty acid used to seal the pores of the metal oxide layer of the dielectric imaging member.

Dielectric imaging members in which a relatively rough, metal oxide dielectric layer is prepared using a deposition process have been found to exhibit significantly longer lifetimes when used in the process of the present invention than was possible with the relatively smooth, anodized metal oxide dielectric layers used in prior processes.

BRIEF DESCRIPTION OF THE DRAWINGS

The various objects, advantages and novel features of the invention will be fully appreciated from the following detailed description when read in conjunction with the appended drawings, in which.

Throughout the drawings, like reference numerals will be used to identify like parts.

Figure 1:
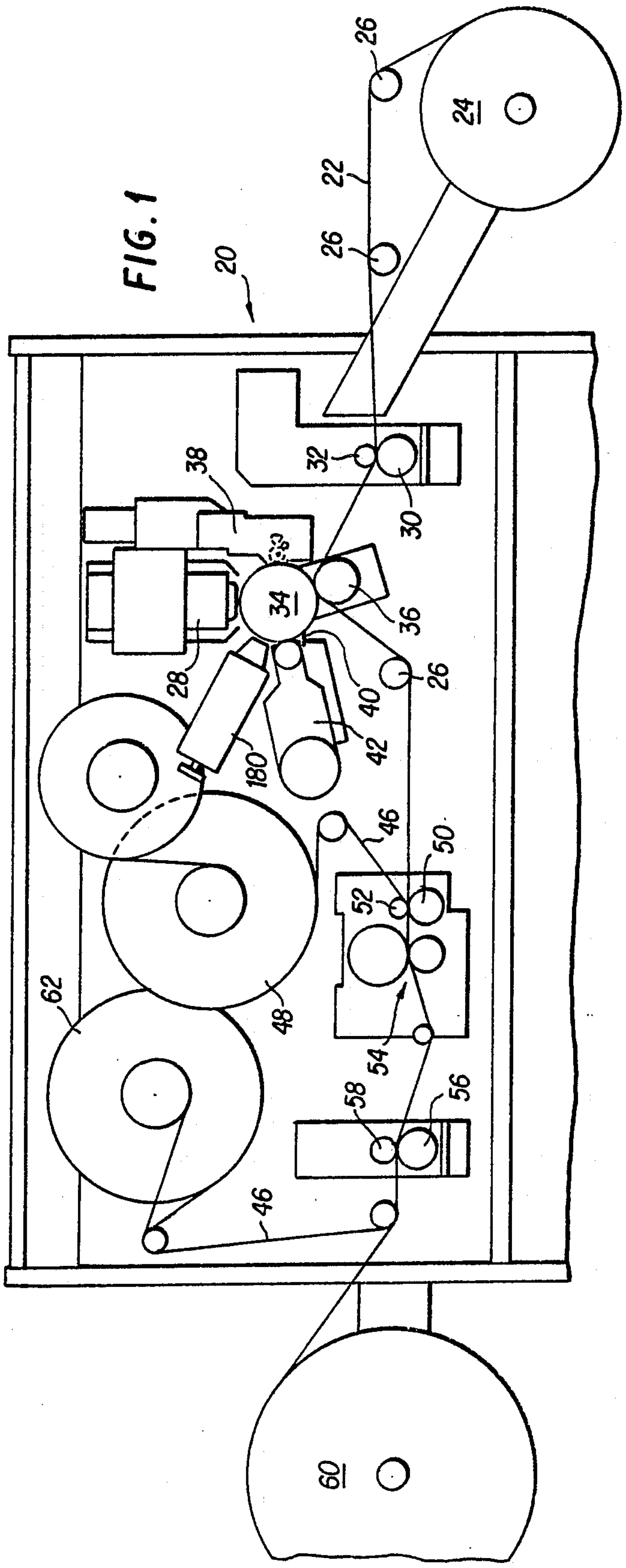
FIG. 1 illustrates an offset electrostatic printing system in which the process of the present invention may be employed.

DESCRIPTION OF THE PREFERRED EMBODIMENTS:

Prior to the offset electrostatic imaging process of the present invention, it had not been possible to take advantage of a dielectric imaging member, such as a dielectric drum, which had been coated with a layer of a metal oxide using a plasma spraying or detonation gun deposition process, even though such coatings were harder and more abrasion resistant than other types of metal oxide coatings. Dielectric layers made by plasma spraying or detonation gun techniques have rougher surfaces with a relatively small number of large pores which are about the same size as the particles of developer material. As a result, the pores in such dielectric layers become very readily clogged with developer material residue, thereby causing the surface of the dielectric layer to become laterally conductive and, as a result, unable to retain an electrostatic charge image.

In accordance with the present process, however, the harder, more abrasion resistant metal oxide coatings made by a plasma spraying or detonation gun deposition process can be advantageously employed to prepare dielectric drums having significantly longer lifetimes than the smoother, anodized metal oxide coatings used conventionally.

A suitable dielectric imaging member for use in the present process is prepared by coating an electrically conductive substrate with a layer of metal oxide. The conductive substrate is preferably a cylindrical drum made of an electrically conductive material, such as stainless steel or aluminum, although any conductive material may be employed. Thus, a wider range of substrates are available than would be available by anodizing to prepare metal oxide layers, since only a limited number of materials, such as aluminum, titanium and magnesium can be anodized. The conductive substrate is preferably non-magnetic when a magnetic developer unit is employed. The substrate should have a yield strength greater than 35,000 psi. Type 303 stainless steel has been found to be particularly suitable.

The conductive substrate is coated using a plasma spraying or detonation gun deposition process. Both plasma spraying and detonation gun deposition processes are well-known coating processes in which a powder is heated near or above its melting point and then accelerated by either a plasma gas stream or a detonation wave in the direction of the substrate to be coated. A coating is formed on impact and consists of many layers of overlapping thin lenticular particles or splats.

The plasma spraying process used a plasma torch having a cathode and an anode in the shape of a nozzle through which a gas, such as argon or nitrogen, or a mixture thereof with helium or hydrogen, flows. A direct current arc maintained between the electrodes generates gas plasma at velocities in the subsonic or supersonic range. The temperature of the plasma may exceed 50,000° F. The coating material is introduced into the arc in powder form where it is melted and accelerated toward the substrate. A high density, integrally bonded coating is produced as the particles strike the substrate.

The detonation gun deposition technique uses a detonation gun which consists of a water-cooled barrel about 3 feet long with a 1 inch inside diameter. Oxygen, acetylene and particles of the coating material are fed into the barrel and then ignited. This creates a hot, high speed gas stream which instantly heats the particles to a plastic state close to or above their melting point and accelerates them at supersonic velocity from the barrel. The particles strike the substrate, depositing a circle of coating a few microns thick. The circle of coating consists of many overlapping thin lenticular particles or splats. Rapid-fire detonations across the substrate build up the coating to the desired thickness. Although temperatures above 6000° F can be reached in the gun, the substrate remains below 300° F.

A more detailed discussion of plasma spraying and detonation gun deposition processes can be found, for example, in Chapter 11, R. F. Bunshah et al., *Deposition Technologies for Films and Coatings*, "Plasma and Detonation Gun Deposition Techniques and Coating Properties", pp. 454–465 (1982), incorporated herein by reference.

The surface roughness of most plasma sprayed or detonation gun coatings is in the range of 100–200 microinch rms as coated. Both types of coatings consist of many layers of thin lenticular particles, with the principal microstructural difference between the two types being that detonation gun coatings have a higher density. A typical lenticular particle may be about 5 microns thick and about 10 to 50 microns in diameter.

The dielectric layer suitable for use in the present process can be made from any metal oxide using the plasma spraying or detonation gun deposition techniques. Non-photoconductive metal oxides are preferred. If a photoconductive metal oxide, such as $TiO_2$, is used to prepare the dielectric layer, precautions must be taken to insure that the imaging process is run totally in the dark. Dielectric metal oxide layers prepared by a plasma spraying or detonation gun deposition technique have a surface hardness which is much greater than that of an anodized metal oxide layer. The hardness of a detonation gun coating is generally higher than that of a plasma sprayed coating of the same composition because of the higher density and greater cohesive strength of the detonation gun coating. Both detonation gun and plasma sprayed aluminum oxide layers are substantially harder than anodized aluminum oxide layers. The dielectric layer may have a surface capacitance of about 300–2500 picofarads/in$^2$, and preferably should have a surface capacitance of about 600–1000 picofarads/in$^2$. Surface capacitance is a function of the dielectric constant of the dielectric layer and of the thickness of the dielectric layer. Capacitance is defined by the formula $C=\epsilon_0 KA/d$, where C is the capacitance in picofarads/in$^2$, $\epsilon_0$ is the permittivity of vacuum and is equal to 8.8 picofarads/m, K is the dielectric constant of the metal oxide, A is the area of the dielectric surface, and d is the thickness of the dielectric layer. Thus, the surface capacitance can be expressed as $C/A=\epsilon_0 Kd$ and the thickness of the dielectric layer can be expressed as $d=\epsilon_0 K/(C/A)$ or $d=\epsilon_0 KA/C$. Typical thicknesses of the dielectric layer made by a deposition process are in the range of 0.003–0.015 inch. Preferably, the thickness of the dielectric layer is 0.004–0.005 inch$\pm$0.0005 inch. In addition, the dielectric layer preferably should have a bulk electrical resistivity of at least $10^{10}$ ohm-cm, and preferably at least $10^{11}$ ohm-cm. Any metal oxide coating prepared by a plasma spraying or detonation gun technique which produces a dielectric layer having the desired surface capacitance and electrical resistivity can be employed in the present process. Aluminum oxide ($Al_2O_3$) is the preferred metal oxide.

The metal oxide coating should be ground and polished to a surface finish of 10 microinches rms or better, if possible, although surface finishes of up to 15 microinches rms have been found to operate satisfactorily. When the surface finish reaches 18 microinches rms, however, print quality deteriorates rapidly since it becomes difficult to clean the oxide layer of excess toner that remains from the previous printing cycle. Surface finishes were measured with a Federal Surf analyzer Model 4000 profilometer. The excess toner becomes embedded in the pores of the oxide, and, since the toner is conductive, it reduces the ability of the oxide surface to retain an electrostatic charge image. In general, the detonation gun process will produce an oxide coating that can be ground and polished to a smoother finish than can be obtained when the coating is produced using the plasma spraying process. This is believed to be due to the higher material deposition velocities that can be achieved with the detonation gun process, resulting in a denser coating with reduced porosity. With the detonation gun process, surface finishes of better than 12 microinches rms have been obtained on a repeatable basis. With the plasma spraying process, the smoothest surface finish obtained is about 15 microinches rms, which is near the upper limit of acceptability for the purposes of the present invention. Moreover, it is difficult to control the plasma spraying process with sufficient precision to obtain the same surface finish each time the process is run. For these reasons, the detonation gun process is the preferred method for creating the oxide coating in the present invention.

Because of their very porous nature, the metal oxide layers prepared by plasma spraying or detonation gun deposition techniques absorb moisture, rendering them conductive and incapable of retaining an electrostatic charge. Any moisture present in the metal oxide coating should be removed and the pores of the metal oxide coating should then be sealed to maintain the dielectric coating moisture-free. Moisture can be removed from the porous layer using any conventional method such as heating, vacuum or dessication. Heating in a vacuum oven is preferred. Following removal of the moisture, the pores of the oxide layer are impregnated with a sealant to seal the pores. Suitable sealants include waxes, such as Carnauba wax, and the metal salts of fatty acids, such as zinc stearate and iron tristearate. Zinc stearate is the preferred sealant. The porous metal oxide layer can be sealed by melting the sealant and then coating the hot porous layer with the molten sealant. Excess sealant should be removed from the surface of the metal oxide layer.

In the first step of the present process, a latent electrostatic image is formed on the dielectric metal oxide layer of the dielectric imaging member which was prepared using the plasma spraying or detonation gun deposition techniques described above and then sealed. The latent electrostatic image can be formed using any of the well-known, non-optical means, such as an ion modulated electrostatic print head which generates ions by a corona discharge from a small diameter wire or point source. The electrostatic print head preferred for forming the latent electrostatic image in the present process is of the type which comprises a modulated aperture board having a plurality of selectively controlled apertures which function to cut off the flow of ions, and an ion generator, such as a corona wire, for providing ions for electrostatic projection through the apertures and onto the dielectric imaging member. Print heads of this type are described in more detail in U.S. Pat. No. 3,689,935, issued to Gerald L. Pressman et al. on Sept. 5, 1972, U.S. Pat. No. 4,016,813, issued to Gerald L. Pressman et al. on Apr. 12, 1977, and U.S. Pat. No. 4,338,614, issued to Gerald L. Pressman et al. on July 6, 1982, all of which are incorporated herein by reference.

The latent electrostatic image on the dielectric imaging member is then developed by depositing a developer material containing oppositely charged toner particles onto the surface of the dielectric layer. The toner particles are attracted to the oppositely charged electrostatic image on the dielectric layer. The latent electrostatic image is preferably developed using a magnetic brush, in which a magnetic element, typically in the form of a cylindrical roll, carries a layer of the developer material on its outer surface. A developer material of the single-component type preferred for use in the present process comprises fine particles of a magnetic material, such as iron or iron oxide, a polymer or mixture of polymers having a relatively low softening point, and a suitable pigment such as carbon black, and may further comprise a conductivizing agent, such as a quaternary ammonium compound or a conductive carbon pigment, to impart surface conductivity. The layer of developer material on the outer surface of the magnetic roll is brought into light brushing contact with the dielectric surface bearing the latent electrostatic image, resulting in the electrostatic transfer of the developer particles from the magnetic roll to the latent image areas.

A developer material which is particularly suitable for use in the present process comprises electrically conductive toner particles, which comprise a polymer or mixture of polymers, including a silicone polymer, a magnetic material, and a pigment, which are mixed with a lubricant such as a metal salt of a fatty acid. Zinc stearate is an example of a suitable fatty acid salt. Preferably, the metal salt of a fatty acid in the developer material is the same metal salt of a fatty acid used to seal the pores of the dielectric metal oxide layer. Zinc stearate is the preferred fatty acid metal salt for use as both the sealant and lubricant. The toner particles preferably contain a magnetic material, since the preferred means for developing the latent electrostatic image is a magnetic brush developer unit.

Of the various commercially available toners, some are more suitable than others for use in the present invention. In particular, it has been found that many commercially available toners have the property of forming a film on the surface of the dielectric layer of the dielectric imaging member which is very difficult to remove. Several of the commercially available toners, however, do not exhibit this undesirable property and can therefore be used for long periods of time. In particular, it has been found that especially suitable toners contain a silicone polymer, such as a carboxylated polydimethylsiloxane, as a component of the polymer phase of the toner. This polymer is typically blended with an aliphatic polymer such as polyethylene or ethylene-vinyl acetate copolymer. In addition to the polymer component, these toners also contain the previously mentioned magnetic pigment, such as black iron oxide; a pigment having high tinctorial strength, such as carbon black; a conductivizing agent, such as a conductive carbon pigment. The toner is rendered suitable for use in the present invention by adding about 1 percent by weight of a lubricant, such as the metal salt of a fatty acid. As noted, zinc stearate is an especially preferred lubricant. The zinc stearate is physically mixed with the toner by being blended with the toner in a Waring Blender or other suitable means. A concentration of about 1 percent by weight of the zinc stearate is preferred, although the concentration may be varied over the range of about 0.5 to about 5 percent by weight as needed for the specific toner used. A very fine grade of zinc stearate is preferred. Type NB-60 (Witco Corp., Organics Division, 520 Madison Ave., New York, N.Y. is especially preferred as it is a precipitated grade with a very fine particle size.

While toners containing zinc stearate are commercially available for use in electrophotographic copiers (the zinc stearate aids lubication of the photoconductive surface), typically these toners do not work for long in the offset printing process herein described. This is believed to be due to the concentration of the zinc stearate and/or the manner in which the zinc stearate is mixed with the toner.

While zinc stearate is a preferred lubricant, other materials may also be used. These may include, but are not limited to, various metal salts of fatty acids, fatty acids, natural and synthetic waxes, various higher alcohols, and other substances with similar physical properties to zinc stearate. The function of the lubricant is to prevent the buildup of fused toner on the surface of the dielectric imaging member. Since the toner is conductive, any buildup of toner that is not removed from the dielectric surface will interfere with proper printing.

The zinc stearate alone is not sufficient to make any pressure fixing, insulating-type toner work. While the exact mechanism by which certain toners work and others will cause a buildup of fused toner on the dielectric imaging member is not completely understood, it is believed to be due to the chemical and mechanical properties of the various toners, including the presence or absence of silicone polymers as described previously. In particular, two specific toners have been found which work better than any of the others which have been tried. One of these toners is type T7161 toner manufactured by the 3M Company (St. Paul, Minn.). The other is Tomoegawa type MCT-2 toner manufactured in Japan by the Tomoegawa Company and distributed in the USA by Tomoegawa USA Inc., 742 Glenn Avenue, Wheeling, Illinois. Although these toners contain silicone polymers, neither of these toners works well without the admixture of zinc stearate as set forth above. After the latent image on the dielectric member is developed, the developed image is transferred to an image receiving surface by means of high pressure applied between the dielectric imaging member and the image receiving surface. If the dielectric imaging member is a dielectric drum, this high pressure can be applied by means of a back-up roller which contacts the surface of the dielectric drum. The image receiving surface, such as a sheet of plain paper, is fed between the dielectric drum and the backup roller, and the developed image on the drum is transferred to the surface of the paper. The zinc stearate which is present in the toner not only prevents the buildup of toner on the surface of the dielectric drum, but also serves to constantly replenish the zinc stearate in the dielectric surface of the drum under the crushing action of the transfer nip.

Not all of the developer material is transferred from the dielectric layer to the image receiving surface by means of pressure. The high pressure forces some of the developer material into the pores of the dielectric layer. Dust from the paper also adheres to the surface of the dielectric layer. This developer material residue, paper dust and other debris is usually removed by scraping the surface of the dielectric layer with a doctor blade. If the dielectric layer were an anodized aluminum oxide layer, then the developer material residue would be readily removed because anodized surfaces are smooth with many very small pores. However, when the dielectric layer is a relatively rough metal oxide layer with larger pores which was prepared by a plasma spraying or detonation gun deposition technique, the doctor blade is not as effective in removing the developer material residue. Although the doctor blade effectively removes the residue above the surface of the dielectric layer, the pores of the dielectric layer remain clogged with residue. It has been found, however, that this developer material residue can be removed from the pores of the dielectric layer by cleaning the surface with a fibrous material. Preferably, the fibrous material is in the form of a web. Web cleaners are a well-known means for cleaning residual developer material from the photoconductive layers of xerographic plates. Typically, a web of fibrous material is brought into contact with the photoconductive layer following transfer of the developed image to the paper. The web is advanced continuously or incrementally so that used portions of the web are removed from contact with the photoconductive layer and replaced with fresh portions. The web is maintained in contact with the surface of the photoconductive layer for a sufficient time to remove the developer material residue. It is also common for the web to contact the photoconductive layer under pressure supplied by a biased resilient backup roller.

Although particularly effective for cleaning the photoconductive layers of xerographic plates, web cleaners have not been employed to remove residual developer material from the dielectric metal oxide layers of electrostatic imaging equipment, such as anodized aluminum oxide layers, plasma sprayed layers, and so on. Because the photoconductive layers of xerographic plates are much smoother and much less porous than even the relatively smooth anodized metal oxide layers on dielectric imaging members, the developer material residue can be easily removed from the surface of the photoconductive layer. However, the developer material residue becomes embedded in the rougher, more porous dielectric metal oxide layers and cannot be as readily removed with a web of fibrous material. Moreover, since dielectric metal oxide layers are much harder than photoconductive layers on xerographic plates, doctor blades have been found to be more effective in removing residual developer material from dielectric layers.

The dielectric metal oxide layers prepared by plasma spraying or detonation gun deposition techniques are much rougher and have larger pores than the anodized aluminum oxide dielectric layers previously employed. Because the pores of the layers deposited by plasma spraying or detonation gun techniques become readily clogged with developer material residue, doctor blades have been found to be ineffective for removing all of the residue.

In accordance with the present process, the dielectric metal oxide layer is cleaned following transfer of the developed image to the image receiving surface, optionally, first by means of a doctor blade to scrape off the developer material residue above the surface of the dielectric layer, and then by bring the dielectric layer into contact with a fibrous material under pressure. The fibrous material is preferably in the form of a non-woven or woven web, although fibrous material in the form of a belt, cylinder or brush could be employed. It is important that the fibrous material be placed in contact with the dielectric metal oxide layer under sufficient pressure so that the fibers are pressed into the pores to remove the developer material residue. A preferred means for applying such pressure is a resilient backup roller. A metal cylinder having its outer surface covered with a layer of conductive silicone rubber has been found to be suitable.

The electrostatic imaging process of the present invention can be employed to produce high quality images for a substantially longer time than previous electrostatic imaging process. Moreover, dielectric imaging members used in the practice of the present process have significantly longer lifetimes than had heretofore been considered possible.

An important advantage of the plasma sprayed surface over an anodized surface is in the area of charge retention. A good anodized surface, one that has the ability to hold charge that is placed on it by a corona device, is difficult to produce and exhibits residual charge, which presents difficulties when the surface is used in an electrostatic printing system. Residual charge is present when an imagewise pattern of charge is placed on the surface, toned, transferred, and then neutralized, on the next print cycle the previous imagewise pattern can be detected. For an initial surface potential of 200 volts, a residual surface charge of 15 volts can be detected after neutralization with anodized surfaces. This level of residual charge makes it necessary for the toning system to have a lower sensitivity, thereby making the overall system less efficient. With plasma sprayed surfaces, however, proper sealing always results in a good surface for corona charging. When the surface is used in an electrostatic printing system, it shows no residual image. The residual surface charge has been measured at less than 4 volts. This lower residual charge level allows for a more sensitive toning system and therefore a more efficient system.

The reason for the differences between the anodized surface and the plasma sprayed surface is not completely understood but is believed to be a result of the way the two surfaces are created. The charge transit time for the plasma sprayed surface is longer by about a factor of ten than for an anodized surface of the same thickness. The charge transit time T is give by the equation $T=L^2/(\mu V)$, in which L is the thickness of the surface, $\mu$ is the charge mobility, and V is the initial surface potential. Since thickness and surface pontential for the anodized surface and the plasma sprayed surface are the same then the charge mobility in the anodized surface must be ten times greater than in the plasma sprayed surface to explain the difference in charge transit time. The mobility of the anodized surface was measured to be 0.0013 ips. This is in the range where, at process speeds, significant charge can penetrate into the surface before neutralization takes place. After neutralization, the zero volt potential on the surface induces some of the charge below the surface to migrate back to the surface. This charge is what causes the residual image. With the plasma sprayed surface having a charge mobility that is ten times slower, less charge has penetrated into the surface at the time of neutralization. When the surface is neutralized, less charge is available to migrate back. This model may explain the difference in behavior between the two types of surfaces.

A further advantage of the plasma spraying and detonation gun deposition processes is that they can be used to produce thicker oxide layers than can be obtained by anodization. Anodized layers are generally limited to a thickness of about 0.002 to 0.003 inch. This results in a layer with a relatively high surface capacitance, and this, in turn, requires that a relatively large amount of charge be deposited on the imaging surface by the print head in order to produce a latent image having a potential that is sufficient to insure proper development. Since the amount of charge which can be delivered by the print head per unit time is limited, a high surface capacitance in the dielectric imaging layer will require that the overall imaging process be run more slowly than would otherwise be possible. In the case of the plasma spraying and detonation gun processes, however, there is no inherent limitation on the thickness of the oxide layer which can be produced. Thicknesses of 0.003 to 0.015 inch are easily obtained using these processes. The greater thickness of the oxide layer results in a lower surface capacitance and allows the imaging process to be run at a considerably faster rate.

Figure 5:
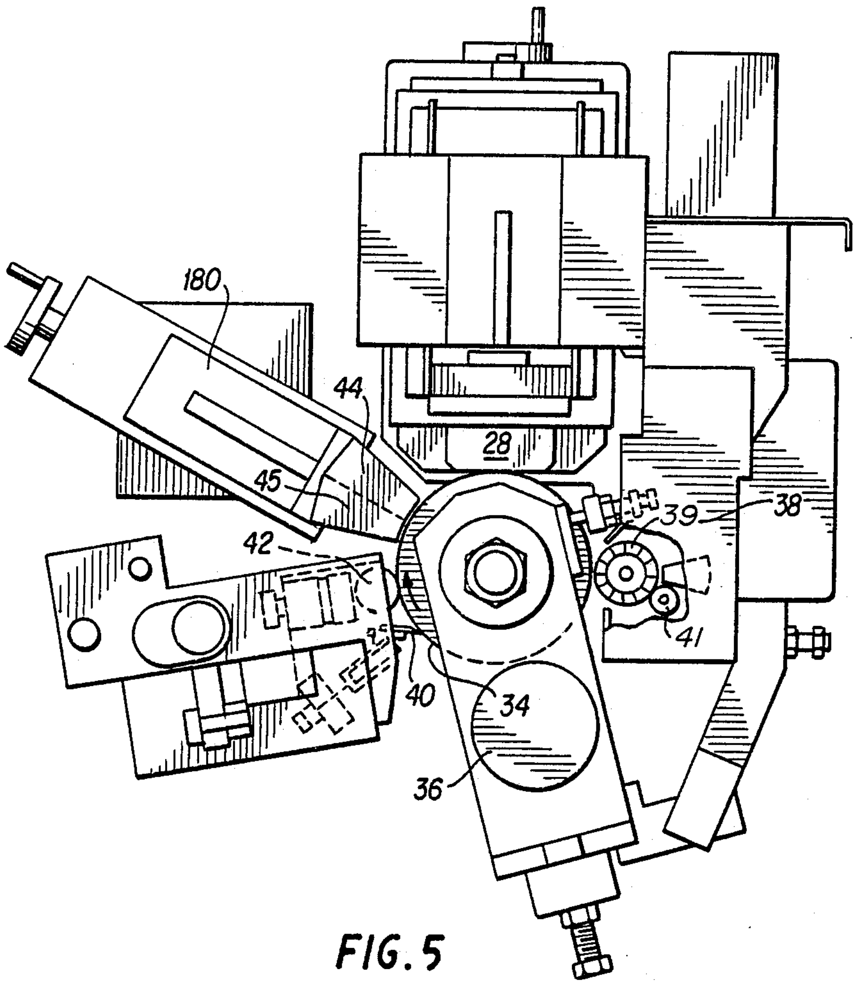
FIG. 5 is an enlarged view of the dielectric-cooled drum and associated components in the offset electrostatic printing system of FIG. 1.

FIG. 1 illustrates an offset electrostatic label printing system 20 which may advantageously be used to practice the process of the present invention. A web 22 of plain paper is fed from a supply reel 24 and is carried by a number of guide wheels 26 through a brake roll nip formed by rolls 30 and 32 and then between dielectric drum 34 and backup roll 36. A latent electrostatic image is formed on dielectric drum 34 which has been coated with a metal oxide layer using a plasma spraying or detonation gun deposition process. The latent electrostatic image is formed by means of an ion modulated electrostatic print head 28 as the drum 34 rotates. The latent image is developed on the drum 34 by the developer unit 38 which includes a feed roll (not shown), developer roll 39, and a slowly rotating roll 41 for maintaining the desired toner thickness on the developer roll. A scraper blade continuously clears the doctor roll 41 of stearate. The developed image is then transferred to the paper web 22 and simultaneously pressure-fixed thereon at the nip between the drum 34 and the backup roll 36. A doctor blade 40 is provided to scrape off the developer material residue followed by cleaning of the dielectric layer with web cleaner 42. Any latent electrostatic images remaining on the drum are then erased by corona neutralizer unit 180 with two corona neutralizers 44, 45 in preparation for subsequent printing cycles. FIG. 5 is an enlarged view of the printing system 20 shown in FIG. 1 in the area around the dielectric-coated drum 34.

A web 46 of overlaminate material is fed from supply reel 48 through a nip formed by rolls 50 and 52 where it is applied over the printed image on web 22. The overlaminated printed web is then cut into finished labels by rotary die cutting station 54 and passed through a drive roll nip formed by rolls 56 and 58. The finished labels are wound onto rewind reel 60 and the cut-out overlaminate web 46 is wound onto waste rewind reel 62.

Figure 4:
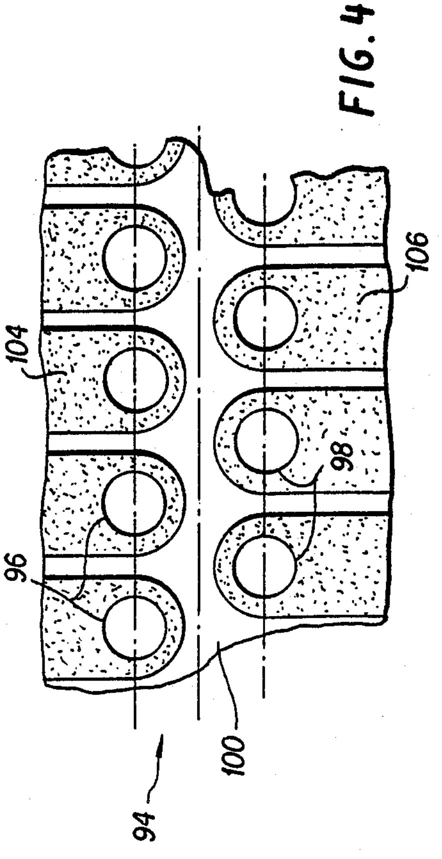
FIG. 4 is a still further enlarged view of the aperture electrodes carried by the aperture mask.
Figure 2:
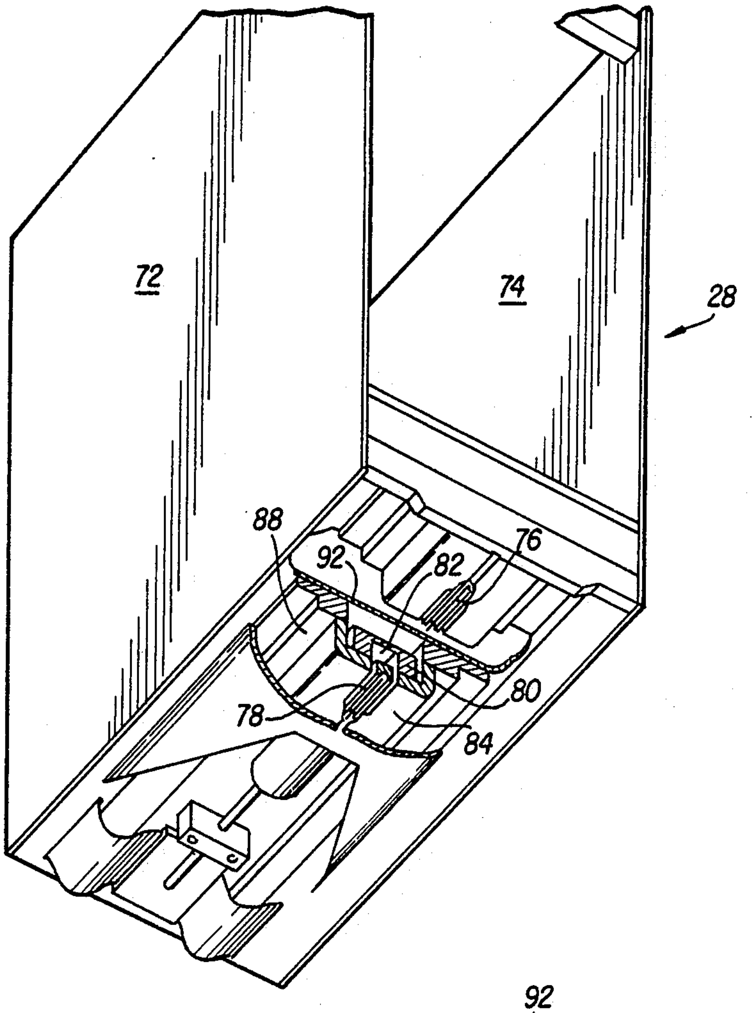
FIG. 2 is a perspective view of the electrostatic print head, with portions cut away to illustrate certain internal details.
Figure 3:
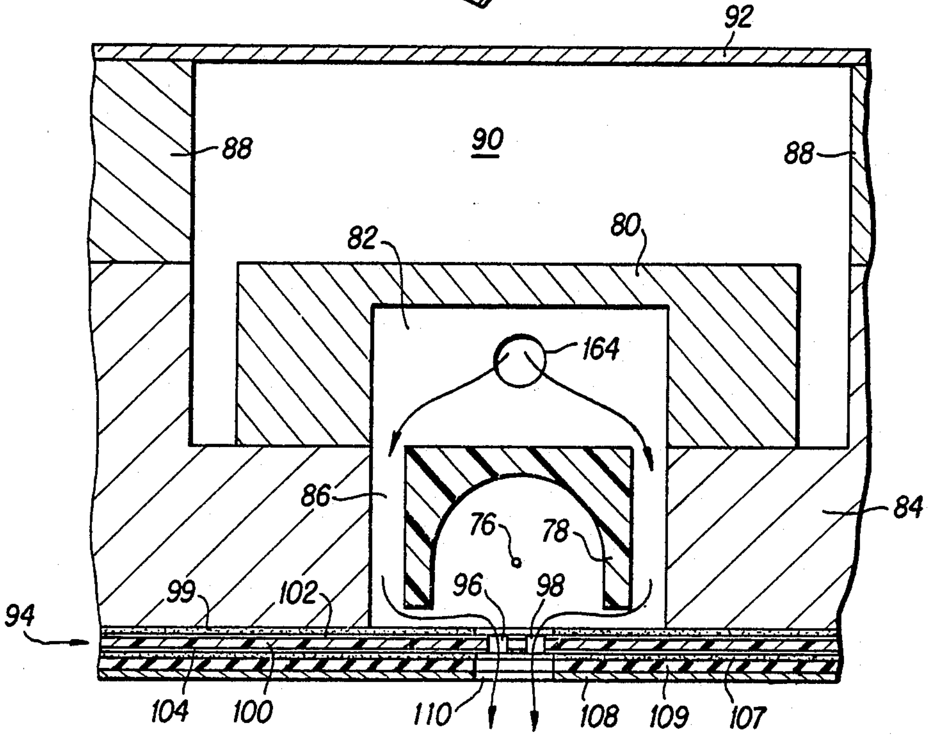
FIG. 3 is an enlarged sectional view of the corona wire and aperture mask assembly of the print head.

FIG. 2 is a perspective view of the electrostatic print head 28 with portions cut away to illustrate certain internal details. FIG. 3 is an enlarged sectional view of the corona wire and aperture mask assembly of the print head, and FIG. 4 is a still further enlarged view of the aperture electrodes carried by the aperture mask. The print head 28 is of the type disclosed and claimed in U.S. Patent 3,689,935, issued to Gerald L. Pressman et al. on Sept. 5, 1972 and U.S. Pat. No. 4,016,813, issued to Gerald L. Pressman et al. on Apr. 12, 1977, both of these patents being expressly incorporated herein by reference. The print head 28 also embodies certain improvements disclosed and claimed in U.S. Pat. No. 4,338,614, issued to Gerald L. Pressman et al. on July 6, 1982 and also incorporated herein by reference.

The print head 28 of FIG. 2 generally comprises a pair of electrical circuit boards 72, 74 mounted on either side of a centrally-located corona wire and aperture mask assembly. The corona wire 76 is enclosed within an elongated conductive corona shield 78 which has a U-shaped cross-section. The corona shield 78 is supported at each of its two ends by a manifold block 80 that is formed with an oblong central cavity 82. The manifold block 80 is nested within a mask support block 84 which is generally C-shaped in cross-section. The mask support block 84 is formed with an oblong central opening 86 which registers with the cavity 82 in the manifold block 80 and receives the corona shield 78. The mask support block 84 is secured at its edges to a print head slider 88, the latter being the primary supporting structure of the print head 28 and carrying the two circuit boards 72, 74. The print head slider 88 is formed with a large central cut-out 90 and is secured to driver board 92.

The corona shield 78 is positioned in facing relationship with an aperture mask formed by a flexible circuit board 94. Referring particularly to FIGS. 3 and 4, the circuit board 94 is formed with two staggered rows of apertures 96, 98 extending parallel to the corona wire 76 and transverse to the direction of movement of the web 22 in FIG. 1. Positive ions produced by the corona wire 76 are induced to pass through the apertures 96, 98 under the influence of an accelerating potential which is maintained between the corona wire 76 and the drum 34 of FIG. 1. The flexible circuit board 94 includes a central insulating layer 100 and carries a continuous conductive layer 102 on the side facing the corona wire 76. The opposite side of the insulating layer 102 carries a number of conductive segments 104, 106 associated with the individual apertures 96, 98 as shown in FIG. 4. Circuit board 94 is secured to mask support block 84 by a thin layer of adhesive 99 and to slotted focus plane 108 by an insulating adhesive layer 109. Circuit board 94 is overlaminated with a thin insulating layer 107. In operation, individual potentials are applied between the conductive segments 104, 106 and the continuous conductive layer 102 in order to establish local fringing fields within the apertures 96, 98. As described in the aforementioned U.S. Pat. Nos. 3,689,935 and 4,016,813, these fringing fields can be used to block or permit the flow of ions from the corona wire 76 to the drum 34 of FIG. 1 through selected ones of the apertures 96, 98. The apertures are controlled by appropriate electronics carried by the circuit boards 72, 74. As explained in the aforementioned U.S. Pat. No. 4,338,614, the performance of the print head may be enhanced by interposing a slotted focus plane made of a conductive material between the modulated apertures 96, 98 and the dielectric-coated drum 34. The slotted focus plane is illustrated at 108 in FIG. 3, with the slot 110 aligned with the aperture rows 96, 98.

In order to prolong the life of the print head 28, dehumidified air may be supplied to the interior of the manifold block through an aperture 164, as shown in FIG. 3. The dehumidified air flows around the corona wire 76 and through the apertures 96, 98, as shown by the arrow in FIG. 3, in order to prevent the formation of deposits that have been found to interfere with proper operation of the print head. Dehumidified air is also caused to flow through the corona neutralizers 44, 45 of FIG. 5 to prevent the formation of deposits in that device. The use of dehumidified air for this purpose is disclosed in the copending patent application of Alan H. Boyer et al. entitled "Electrostatic Printer and Imaging Process Utilizing Dehumidified Air", filed on Oct. 4, 1985 under Ser. No. 784,506 now U.S. Pat. No. 4,734,721. As disclosed in the copending patent application of Alan H. Boyer et al. entitled "Offset Electrostatic Printer and Imaging Process Using Dehumidified Air", filed on July 29, 1986 under Ser. No. 890,303, now U.S. Pat. No. 4,772,901, the dehumidified air is particularly advantageous when the print head and corona neutralizer are used in connection with a dielectric-coated drum, as in the present process, since the air which impinges on the drum surface drives moisture out of the pores of the dielectric layer and thereby maintains good printing quality. Heated air may be used in place of dehumidified air as disclosed in the copending patent application of Alan H. Boyer et al. entitled "Electrostatic Printer and Imaging Process Utilizing Heated Air", filed on July 29, 1986 under Ser. No. 890,305, now U.S. Pat. No. 4,809,026, and the copending patent application of Alan H. Boyer et al. entitled "Offset Electrostatic Printer and Imaging Process Utilizing Heated Air", filed on July 29, 1986 under Ser. No. 890,304, now U.S. Pat. No. 4,809,027. All of the foregoing patent applications are incorporated herein by reference.

EXAMPLE 1

A test apparatus comprising the components of FIG. 5 was constructed and arranged to print on a strip of label stock fed from a supply roll. The imaging drum was made of type 303 nonmagnetic stainless steel with a diameter of 4 inches and a width of 4.5 inches. A layer of aluminum oxide ($Al_2O_3$) was formed on the surface of the drum by the detonation gun process to provide a dielectric imaging surface. The dielectric layer was sealed with zinc stearate and was then ground and polished to produce a layer 0.005 inch thick having a surface finish of about 10 microinch rms. The surface capacitance was about 800 pf/in$^2$. The backup roll was 2.5 inches in diameter and comprised a 2 inch steel core covered by a 0.25 inch layer of Stat-Kon "R" Series nylon, available from LNP Corporation of Malvern, Pennsylvania, to assist in static discharge. A pressure of about 300 lb/in was applied between the backup roll and the dielectric-coated imaging drum. The doctor blade was made of hardened steel $\frac{5}{8}$ inch wide and 0.015 inch thick, with a beveled leading edge. Doctor blades of this type are available in strip form from Allison Systems of Riverside, N.J. The doctor blade was held at a 45° angle relative to the drum surface with its leading edge facing in the upstream direction of the drum rotation in order to remove excess toner from the drum surface by a shaving or peeling action. A pressure of about 5–10 lb was applied between the scraper blade and the drum surface by means of a spring bias. The web cleaner consisted of an A. B. Dick Model 660 fabric cleaning web impregnated with zinc stearate and cut to a width of 4.5 inches. The cleaning web was held against the drum surface by an elastomer backup roll with a force of about 0.5 lb, and was advanced by a clock motor at a rate of about 0.003 inch per second. The corona neutralizer and print head were supplied with dehumidified air to prevent the formation of deposits in these components and to reduce moisture in the drum surface. The toner used in the developer unit was Tomoegawa type MCT-2 toner mixed with zinc stearate at a concentration of about 1 percent by weight. Printing of alphanumeric and bar code data was carried out at a rate of 7 inches per second and was continued for over 40 hours, producing in excess of 1 million lineal inches of printing, without any noticeable degradation of printing quality as determined by visual observation.

EXAMPLE 2

The previous example was repeated using 3M type T7161 toner mixed with zinc stearate at a concentration of about 1 percent by weight. Similar results were obtained.

EXAMPLE 3

Example 1 was repeated using 3M Type 7161 toner without any added zinc stearate. After about 1000 lineal inches of printing, a buildup of fused toner formed on the drum and the printing quality was reduced to such a degree that acceptable labels could no longer be printed successfully.

EXAMPLE 4

Example 1 was repeated with the web cleaner removed from contact with the surface of the dielectric-coated drum. After several hours of operation and about 40,000 lineal inches of printing, the system showed a noticeable reduction in print quality. This was traced to accumulations of toner on the print head near the apertures.

EXAMPLE 5

Example 1 was repeated with the doctor blade removed from contact with the surface of the dielectric-coated drum. The system ran for only a few minutes, producing about 1,000 lineal inches of printing, before the print quality degraded noticeably. The poor print quality was determined to have been caused by toner remaining on the surface of the drum.

EXAMPLE 6

Example 1 was repeated using a drum coated with aluminum oxide using a plasma spraying process, resulting in a surface finish of about 18 microinches rms. When the system was run, print quality degraded after about 5,000 lineal inches of printing. The poor print quality was believed to be caused by the excessive roughness and porosity of the oxide surface, which rendered doctor blade and web cleaner incapable of removing all of the excess toner that was not transferred to the label stock at the pressure transfer point.

EXAMPLE 7

Example 6 was repeated with a different drum, also coated with aluminum oxide using a plasma spraying process, but exhibiting a surface finish of about 15 microinches rms. The system ran for over 40 hours, producing in excess of 1 million lineal inches of printing, without noticeable degradation in print quality.

EXAMPLE 8

Example 1 was repeated using Hitachi HMT-605 single component magnetic toner, which did not contain a silicone polymer, but which was mixed with about 1 percent by weight of zinc stearate. After about 1500 lineal inches of printing, the print quality became poor due to a buildup of fused toner on the drum.

What is claimed is:

1. An offset electrostatic imaging process comprising the steps of:

(a) forming a latent electrostatic image on a dielectric imaging member, said dielectric imaging member being prepared by coating an electrically conductive substrate with a porous layer of a non-photoconductive metal oxide using a deposition process;

(b) developing the latent electrostatic image with a developer material which comprises a silicone polymer and from about 0.5 to about 5 percent by weight of a metal salt of a fatty acid;

(c) transferring the developed image to an image receiving surface by applying pressure between the dielectric imaging member and the image receiving surface;

(d) cleaning the dielectric imaging member using a first cleaning means which is effective to remove developer material residue from above the surface of the porous oxide layer; and (e) further cleaning the dielectric imaging member using a second cleaning means which is effective to remove developer material residue from the pores below the surface of the oxide layer.

2. The process of claim 1 wherein the metal oxide has a bulk electrical resistivity of at least $10^{10}$ ohm-cm, and a surface finish of less than 18 microinches rms.

3. The process of claim 2 wherein the metal oxide is aluminum oxide.

4. The process of claim 2 wherein the bulk electrical resistivity is at least $10^{11}$ ohm-cm.

5. The process of claim 2 wherein the surface finish is less than 15 microinches rms.

6. The process of claim 1 wherein the surface capacitance of the metal oxide layer is from about 600 to about 1000 picofarads/in$^2$.

7. The process of claim 1 wherein the diamond pyramid hardness (kg/mm$^2$ @ g load) of the metal oxide layer is at least 500.

8. The process of claim 7 wherein the diamond pyramid hardness (kg/mm$^2$ @ g load) of the metal oxide layer is at least 1000.

9. The process of claim 1 wherein the deposition process is a plasma spraying process.

10. The process of claim 1 wherein the deposition process is a detonation gun process.

11. The process of claim 1 wherein the latent electrostatic image is formed by means of an ion modulated electrostatic print head.

12. The process of claim 1 wherein the ion modulated electrostatic print head comprises a modulated aperture aboard having a plurality of selectively controlled apertures therein, and an ion generator for providing ions for electrostatic projection through the apertures.

13. The process of claim 1 wherein the first cleaning means is a doctor blade.

14. The process of claim 1 wherein the second cleaning means is a fibrous material.

15. The developer material of claim 14 wherein the metal salt of the fatty acid is zinc stearate.

16. A developer material which is suitable for repeatedly developing a latent electrostatic image on a porous layer of a non-photoconductive metal oxide dielectric imaging member using a magnetic brush, the residue of said developer material being readily removable from the dielectric imaging member following development of the latent electrostatic image on the dielectric imaging member and transfer of the developed image to an image receiving surface, said developer material comprising:

(1) fine particles of a magnetic material, (2) a polymer or a mixture of polymers having a relatively low softening point, wherein at least one of the polymers is a silicone polymer, (3) a pigment, and (4) from about 0.5 to about 5 percent by weight of a metal salt of a fatty acid.

17. The developer material of claim 16 further comprising a conductivizing agent.

* * * * *

UNITED STATES PATENT AND TRADEMARK OFFICE

CERTIFICATE OF CORRECTION

PATENT NO. : 4,864,331

DATED : September 5, 1989

INVENTOR(S) : Alan H. Boyer et al.

It is certified that error appears in the above-identified patent and that said Letters Patent is hereby corrected as shown below:

Column 12, line 7, "insulating layer 102" is changed to read --insulating layer 100--;

Column 15, lines 9 and 12, --300-- is inserted after each occurrence of "@";

Column 15, line 22, "claim 1" is changed to read --claim 11--; and

Column 16, line 5, "claim 14" is changed to read --claim 16--.

Signed and Sealed this

Twelfth Day of November, 1991

*Attest:*

HARRY F. MANBECK, JR.

*Attesting Officer*

*Commissioner of Patents and Trademarks*